FIG. 2

Patented June 17, 1930

1,764,040

UNITED STATES PATENT OFFICE

WILLIAM C. EDWARDS, JR., OF KANSAS CITY, MISSOURI

COMBINATION HARVESTER, THRASHER AND SEPARATOR

Application filed December 20, 1926. Serial No. 155,945.

My invention generally relates to a thrasher provided with a harvester or header for cutting and gathering standing grain and delivering the same to the thrasher to be thrashed and separated. It will be further understood that the header or harvester portions and the thrasher portions are in a suitable alliance, so that the machine as a whole is drawn through the field of standing grain by animal or tractor power. The selected motor power serves to drive the operative mechanisms on both the harvester and thrasher elements as will be readily understood.
In the development of machines of this class commonly called combines, the established practice is to provide the usual header platform furnished in a desired width, together with guards, ledger plates, sickle bar, platform canvas slatted raddle or grain straw auger and reel which has during operation conveyed the cut grain straw in a sidewise travel to a feed house of a harvester-thrasher. The thrasher is arranged at right angles to the header platform with a feed house, as an extension feeder to the cylinder, positioned forwardly from the separator proper or so that the straw, delivered into the feed house, is immediately turned at right angles and carried rearwardly by a conveyor, thence beneath a cylinder and over a concave where the grain is thrashed; and rearwardly therefrom are arranged straw racks, straw carriers, grain pans and the like together with fans, beaters, chaffers, screens, sieves, conveyors, augers, etc., for the further separating of the grain from the thrashed grain straw and the straw is discarded and the grain elevated for delivery to wagon, tank or truck in the well understood manner. Combines present a wide front and the foregoing type of machine presents a considerable depth. One of the objects of my invention is to greatly decrease this depth and at the same time greatly increase the space for thrashed straw travel and consequently gain increased separation and eliminate the tendency to carry over grain in the thrashed straw ejected from the machine. I accomplish this by positioning the cylinder so as to deliver the thrashed straw into the forward side of the main separator, rather than into the forward end thereof as in the common practice. This decrease in depth of the machine also permits the machine to be shedded in a much less space. Another object is to feed harvested elements from any preferred type of harvesting mechanism direct to the periphery of an overshot rotary element, which serves to comb and regulate the feed of said elements through a confined passage to the thrashing chamber. I have found that combines as a rule have considerable side draft, especially where a wagon is towed along the side to receive the thrashed grain, or where an auxiliary grain tank is carried at the side of the machine. In my invention side draft is eliminated. Another objectionable feature in many combines is the slipping of the drive belt commonly employed. In my invention I preferably drive the cylinder direct from the motor as later explained. Combines as a rule are built in a very compact manner with the disadvantage that when interior parts become clogged, or parts break it is a very tedious and difficult process to make repairs. By the arrangement of the parts of my machine I allow for easy access to all sections of the machine under such conditions.

Similar numerals of reference indicate corresponding parts throughout all the figures of the drawings. It will be understood that suitable bearings are provided for all shafting and the like throughout the machine. One of the greatest difficulties experienced with farm machinery, is in the lack of proper and suitable bearings and oiling systems. Wherever deemed necessary in lieu of the ordinary plain bearings it will be understood I preferably employ roller or ball bearings, with pressure lubrication as a positive oiling assurance.

Referring to the drawings; the frame members of the thrasher are shown at 20 and are supported by axles 21 and $21^x$ for the rear wheels 22 and 23 and by the castor wheel assembly 24 at the front of the machine. The grain wheel 25 is mounted on the axle $21^y$. At 26 is seen the header platform provided with the usual reel 27. A universal joint 28 connects the axle $21^y$ to the axle $21^x$. The header platform 26 is raised and lowered by means not shown and as in customary practice. A brace 29 connects between the frame at 30 and the axle $21^y$ at 31. The header platform is supported by arms 32 and 33 pivotally mounted on the axle $21^y$ and counterbalanced by a weight 34. $20^y$ and $20^z$ are cross frame members.

The motor 35 is supported from the frame of the thrasher; the radiator 36 faces towards the front of the machine and its fan is mounted above and driven from the motor flywheel. Also supported on frame members 20 is the front platform 38, where the driver of the animal power, if used, may stand. The engine platform 39 provides ample room for the operator of the combine. Here he is positioned so as to keep watch of the motor and all thrasher mechanisms and also being behind the header platform can better comprehend the requirements of the situation in general. As will be seen the crank 37 of the engine is positioned at the rear. The tongue 40 of the front wheel assembly is hitched to a tractor or to animal power as desired and the machine is moved to the field of standing grain where the motor 35 is started.

The description of the remaining elements of my combined harvester thrasher will be best understood by showing the operative working conditions of the various elements during the continuous process of first cutting the standing grain and thence the travel of the severed grain straw, the thrashing, the separating and the handling of the cleaned grain and the straw refuse. It will be understood that I prefer to employ the auxiliary motor 35, though if deemed advisable especially for the smaller machines, I may take power off of the tractor as has been done.

Figure 1:
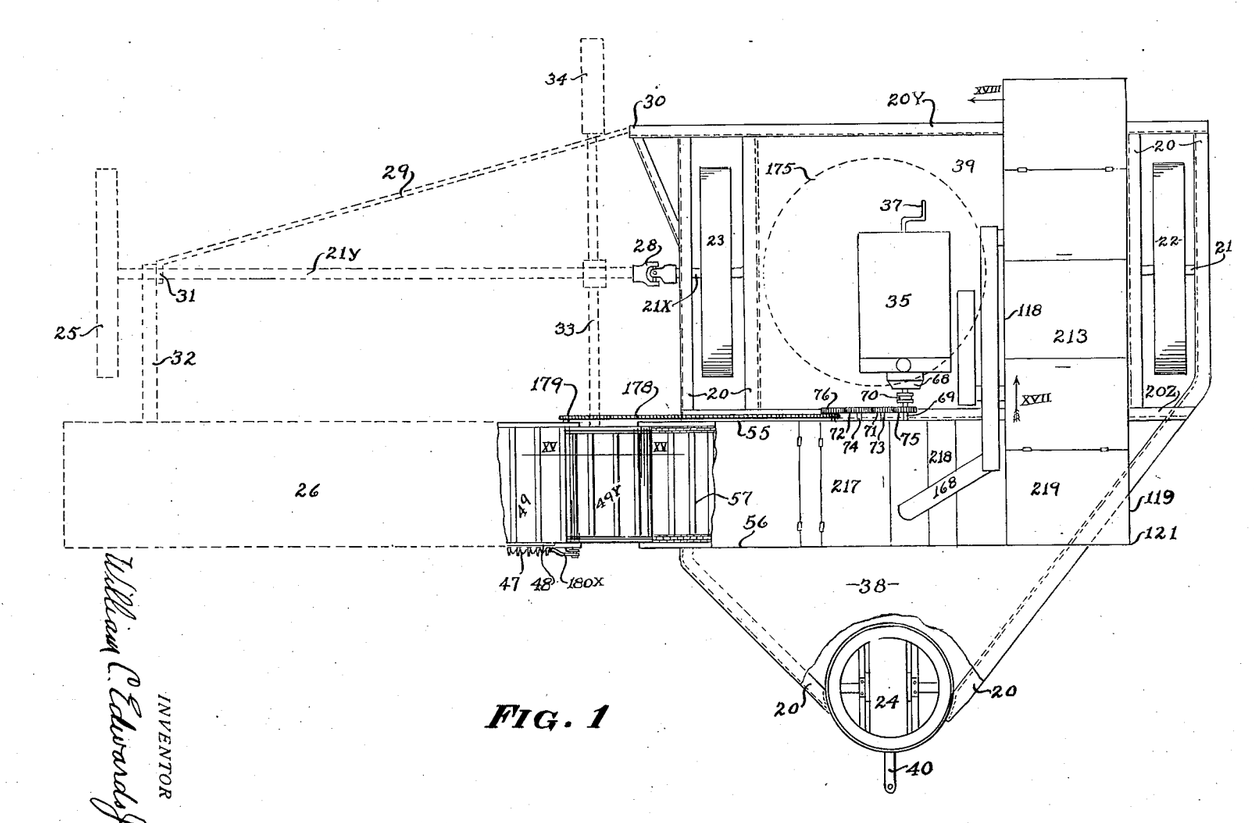
Fig. 1 represents a general plan view of my improved thrasher with a harvester mechanism associated therewith.
Figure 10:
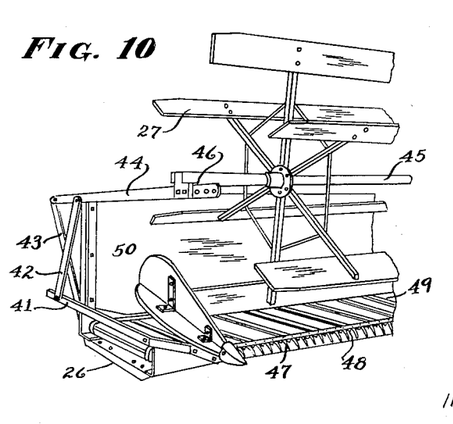
Fig. 10 is a perspective view of the outer end of the harvester showing parts thereof.

Referring to Figs. 1, 10, the header platform 26 has brace members 41, 42, 43 and 44 supporting the outer end of the reel 27 mounted on the shaft 45 rotating in the bearing 46. The other end of the shaft 45 is driven by power from the engine 35 transmitted through chains, gears and other elements of a train in the well understood manner. At 47 are seen ledger plate guards; at 48 is the sickle bar; at 49 is the platform canvas and at 50 is the back screen. This is one of the preferred forms of harvester platform arrangements for receiving harvested elements from the cutting mechanism and for conveying the same towards the cylinder of the thrasher for thrashing purposes. A spiral conveyor or grain straw auger operating in a platform conveyor casing may be employed in lieu of the canvas 49 if desired and as previously mentioned.

As the machine travels forwardly, the reel 27, which may be driven by means associated with the wheel 25 or from the motor 35 as desired, revolves and draws the standing grain against the engine driven sickle 48; the severed grain straw falls upon the platform or so that any conveying means employed therewith will advance the harvested elements directly against the periphery of the impeller 65 so as to be seized by peripheral elements of said impeller and stripped off and away from the platform and conveying mechanisms and elevated and advanced therefrom at a greatly increased speed. As illustrated the straw is moved horizontally towards the right and then up the inclined travel of the platform canvas now serving as the lower elevator canvas $49^x$ and for delivery to the overshot impeller 65 for high speed distribution to the thrashing cylinder 78. The upper elevator canvas $49^y$ assists in preventing the straw from being blown away. The elevator 51 is pivoted at 52 to the platform 26. Base elements 53 on the elevator are slidable upon the supporting frame member $20^x$ and the elevator projects within the feed house 54 of the thrasher. The sidewalls 55 and 56 of the forward portion of the thrasher are of suitable construction and framing to support the operative mechanisms later described. It will be noted that transverse sidewalls 55 and 56 lie in parallel vertical planes and that in approximately these same planes are the front and rear edge elements of the header platform.

Figure 2:
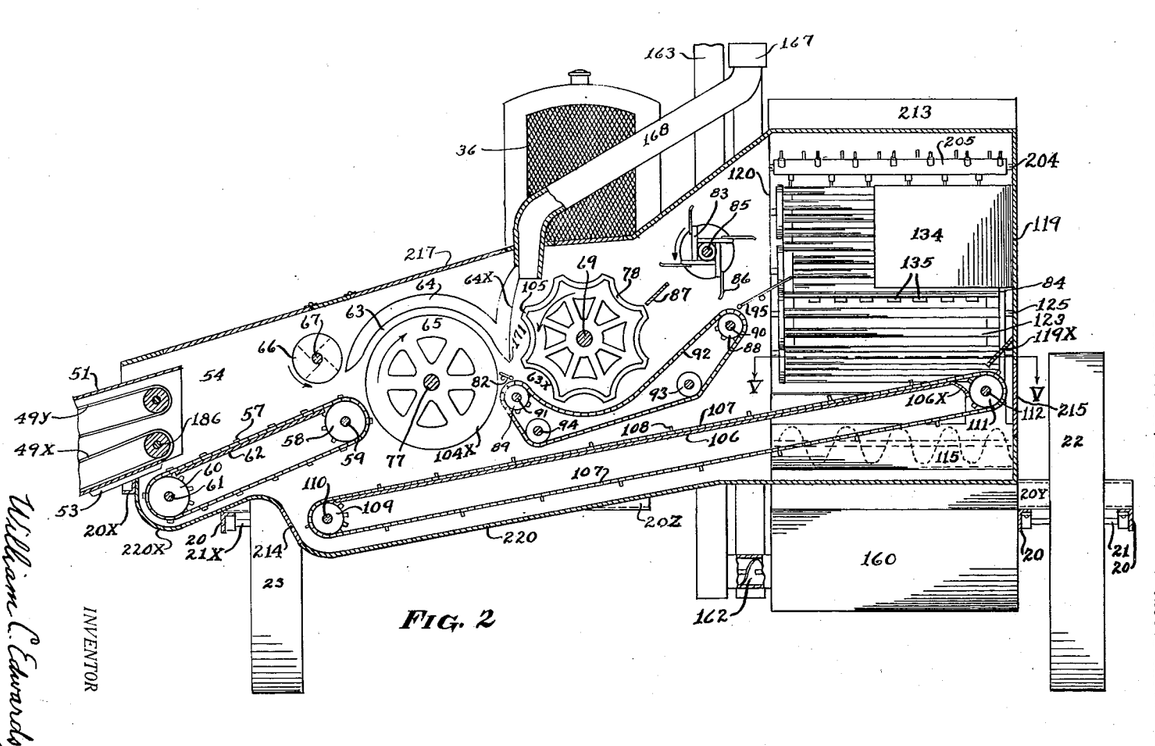
Fig. 2 shows a front view of the thrasher and the broken end portion of the header elevator with the forward frame elements and sides of the machine removed to disclose the operative internal mechanisms.
Figure 6:
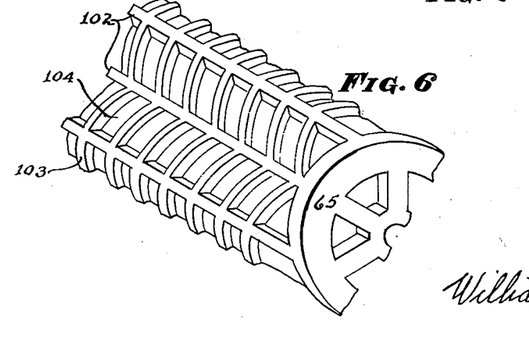
Fig. 6 is a fragmentary isometric view of a portion of the impeller formed as a first cylinder drum.
Figure 8:
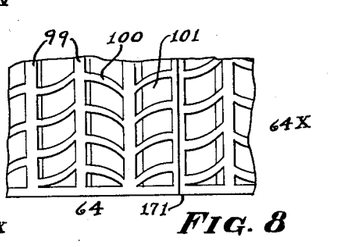
Fig. 8 is a view of a fragmentary portion of the underside of the first and tailings concave.

A chain feed rake 57 carried by sprockets 58 on the driven shaft 59 and sprockets 60 on idler shaft 61 receives the headed straw as dropped from the platform canvas 49, and drags it evenly over the steel floor 62 to the gap spacing 63 intermediate the covering element 64, which may be faced as seen in Fig. 8 as a superposed concave, and the rotary impeller 65, which may be formed as seen in Fig. 6 as an overshot cylinder. The elements 49$^x$ and 57 serve as an adjustable elevating means for traveling harvested elements from the platform 62 direct to the overshot impeller 65 for an overshot delivery at a high speed direct to the thrashing cylinder 78. If desired the element 49$^x$ may deliver direct to the passage 63, eliminating the assembly 57, 59, 61 and 62. The feed rake 57 travels in the same direction as the canvas 49$^x$. At 66 is a feeding roller driven by the shaft 67. When in engagement, the motor clutch 68 transmits engine power direct to the cylinder shaft 69 through the universal joint 70. Idle gears 71 and 72 mounted on spindles 73 and 74 transmit power from gear 75 on shaft 69 to drive gear 76 on the shaft 77 of the overshot impeller or cylinder 65 which travels clockwise while the main cylinder 78 travels counter-clockwise as seen in Fig. 2. It will be noted that the shaft 77 of the impeller 65 is parallel with and lower than the shaft 69 of the thrashing cylinder, the impeller 65 being arranged so that the impelled overshot and elevated delivery of the harvested elements, received from the conveyor 49$^x$, will be driven by the rapidly rotating impeller 65 to a preferred position on the cylinder 78 for the best thrashing practice.

Figure 9:
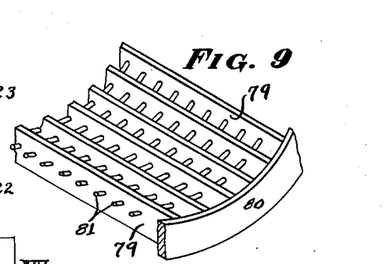
Fig. 9 is a fragmentary view of a stationary concave as commonly used in combination with a cylinder of the type shown in Fig. 7.

Beneath the cylinder 78 is adjustably arranged any desired type of concave. The usual concave employed in such assemblies is seen in Fig. 9 and comprises a plurality of bars 79, spaced apart, and rigidly secured to the paired curved side members 80. A plurality of rods 81 at spaced intervals are threaded through holes in the bars 79. All concaves are provided with means for adjustment as is well understood, which regulates the gap spacings of the straw passage between the cylinder and the concave. Instead of using the stationary concave seen in Fig. 9 I may employ the traveling chain grate seen in Figs. 2, 11, 12 and 13. A grate 82 deflects straw coming from the gap 63 upon the concave under the main cylinder 78 to the gap spacing 63$^x$. The cylinder 78 drives the straw towards the right of Fig. 2 under the beater 83 and so as to be cast upon the transversely moving straw carrier 84. The beater 83 is rigid on the driven shaft 85 and is provided with a plurality of forks 86 whose function is to loosen and toss the beaten matted straw outwardly and upon the conveyor 84, while tending to promote separation in the transverse passage. At 87 is seen a shield which prevents the straw from wrapping around the cylinder 78.

The chain grate 92 in Fig. 2 is suspended on the sprockets 88 and 89 which are mounted upon and driven by the shafts 90 and 91 and at an equal speed or so that the grate 92 always hangs and travels at its proper sagged relationship to the cylinder 78. At 93 and 94 are idlers. A plurality of fingers forming a grate 95 extends from the concave and over the straw carrier 84. The chain grate 92 comprises a plurality of bars 96 provided with projecting ribs 97 on either side. Each bar attaches to the side chain at a link as at 98. The ribs 97 and the rods 81 keep straw from dropping through though permitting grain kernels to drop through onto the grain pan or traveling conveyor, floor 106.

The covering element 64 defines the stationary side face of the passage 63; since the purpose of a thrasher is to thrash, I may take advantage of the impelled travel of harvested elements, as conveyed by the impeller 65 for a high speed distribution upon the thrashing cylinder 78, to do some preliminary thrashing. The plate 64 may be smooth but is preferably cast as seen in Fig. 8 and comprises a concave plate provided with projecting transverse ribs 99 connected by curved intermediate ribs 100 thus forming cup shaped depressions 101. The ribs 99 and 100 cooperate with similar ribs 102 and 103 on the first cylinder 65 to shell out the grain kernels which drop within the cups 104 during the travel of the grain straw through the gap 63, and when a cup reaches the point 104$^x$ by centrifugal force the grain within a pocket 104 will be cast outwardly upon the traveling conveyor 106.

Figure 7:
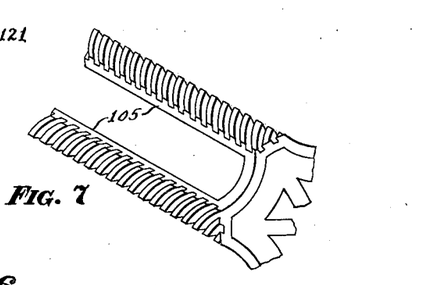
Fig. 7 is an isometric view of a fragmentary portion of the second cylinder.

The cylinder 78 is provided with a plurality of transverse bars 105 spanning between the cylinder heads as in Fig. 7. Each bar is of the rasp type as disclosed, the bars being disposed so as to alternate the rasp ribs in a herringbone fashion. The impeller 65 being at a lower elevation than the cylinder 78 serves to promote elevation of harvested elements to the cylinder in a more proper manner than heretofore. The impeller need not rotate at the high speed of the cylinder 78, thus the slower travel of the harvested elements on the platform is subjected to an influence that tends to increase the velocity of the flow prior to its final distribution upon the periphery of the cylinder 78 itself. This intermediate tendency to speed up the straw travel serves to greatly eliminate the tendency to back feed in the feeding chamber of harvester-thrashers and by eliminating back feeding one of the greatest drawbacks to proper combining is done away with.

Figure 14:
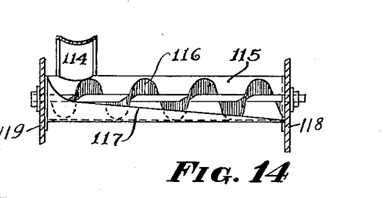
Fig. 14 is a face view of the grain distributing auger looking in the direction of the arrows, Fig. 5 at XIV—XIV.

At 106 is the steel floor or grain pan of the traveling conveyor, the conveyor comprising parallel side chain members 107 connected by transversely disposed, spaced apart, angle irons 108 attached to links of the chains. The chains lead around the sprockets 109 on the driven shaft 110 and around the sprockets 111 to drive the shaft 112 provided with the grain auger 113. The floor at its upper outer end curves down and around the auger 113 as a trough 106$^x$. A chute 114 at the rear end of the trough 106$^x$ leads to the trough 115 of the grain distributing auger 116. The edge 117 of the trough 115 is higher at the left of Fig. 14 and progressively drops downwardly and inwardly towards the right thereof as is customary practice for grain distributing auger assemblies. The thrashing has been accomplished in the transverse passage 55—56. The passage now turns rearwardly between the walls 118—119.

The thrasher body portions thus form an L-shaped passage intermediate the walls 55—56 and 118—119, as disclosed.

The customary practice has been to extend a floor such as 220$^x$ the full length of the feed house 54. However this is objectionable in that the rake 57 tends to drag some of the short straws, chaff and prethrashed grain rearwardly which would collect beneath the roller 61 and pack and stop the conveyor 57. I have arranged the floor 106 of the auxiliary conveyor so as to project forwardly a considerable distance and under the forward part of the floor 62 or so that the floor 106 would catch any heads, grains, chaff and the like and move it towards the sieves and tailings auger, instead of permitting it to drag rearwardly under roller 61.

The straws during their travel through the passages 63 and 63$^x$ are given a novel treatment aside from the customary thrashing. The cylinder 65 traveling in the direction of the arrow causes the lower side of the straw stream in gap 63 to travel faster than the upper side of the straw stream next the stationary concave 64. This produces an internal rolling of the straws and heads which serves to thrash out part of the kernels which are cast by the cups 104 upon the floor 106. But, upon the straw stream reaching the gap 63$^x$, the lower side of the straw stream slows up while the cylinder 78 revolving in the reverse direction causes the upper layer of the straw stream to travel faster than the lower layer. Thus the internal movement of the straw stream through gap spacing 63$^x$ is the opposite of that in gap spacing 63, the effect being to produce the reverse rolling effect customary where sample heads are rolled in the palms of the hand. The cylinder 78 beats kernels through the concave 96 upon the floor 106. The beater 83 catches the matted straw and flying grains coming from the cylinder 78 and throws it down upon the rake 96 and this also increases the amount of kernels delivered to the floor 106. The straw is pitched by the forks 86 upon the transverse rearwardly moving rotary straw carrier 84.

One of the most common troubles with grain separators has been the tendency of the flying grain coming from the cylinder to be thrown out of the machine through the straw exit at the rear of the straw walkers or carriers. Sometimes canvas curtains or metal flaps are used as retarders. The wall 119 and the change in direction of the straw as driven off the fingers 95 serves to effectually stop the flying grain from this tendency to be carried over. Most of the grain has been driven through grates and concave openings upon the floor 106. However some of the kernels still remain in the straw. In my invention this rearward turning of the thrashed straw assists in causing separation and performs a useful office in contradistinction to the objectionable method of turning and tangling the headed straw by a right angle turn before passing through the cylinder as in customary combine practice. Furthermore thrashed straw makes a turn more readily than does the heavier non-thrashed straw.

Figure 4:
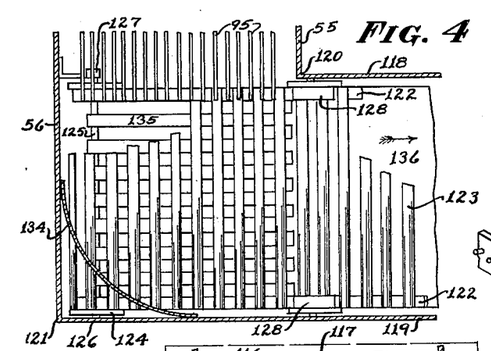
Fig. 4 is a sectional view taken along the line IV—IV, Fig. 3 and looking in the direction of the arrows.
Figure 5:
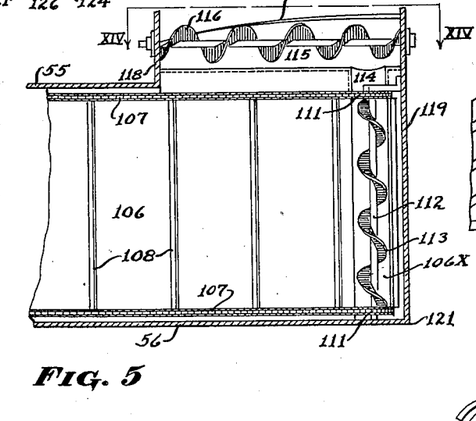
Fig. 5 is a sectional view taken along the line V—V, Fig. 2 and looking in the direction of the arrows.

While various straw walking and straw carrier mechanisms have been devised, I show the straw carrier 84 which is arranged between the walls 118 and 119 which stand at right angles to the walls 55 and 56, with which they intersect at 120 and 121, respectively. The straw carrier 84 consists of two continuous rubber belts 122 to which wooden slats 123 are riveted at spaced intervals. The carrier 84 is carried over the rollers 124 housed in bearings 126, 127, Fig. 4, under idlers 128, over rollers 129 on the shaft 130, under idlers 131 and around the driven five sided roller 132 on the driven shaft 132$^x$ thence back under idlers 133 to roller 124.

At 134 is a vertical curved plate secured to the walls 56 and 119 behind the intersection 121 and above the straw carrier 84. The plate 134 and the wall 119 being in the path of the flying grain prevents it from being blown out of the separator. Beyond the grate 95 and between the intersections 120 and 121 of the walls is seen a perforated floor composed of spaced apart slats 135 arranged under the slats 123 of the carrier 84. The curved plate 134 serves to deflect, roll and turn the straw stream rearwardly at right angles to its prior travel. The allied forces and elements at this junction perform the useful function of opening up passages through the straw to permit the kernels of grain to fall between the slats 135 upon the floor 106.

The floor 135 bends upwardly at 136 as an unperforated plate over which the carrier 84 drags the straw rearwardly. The plate 136 bends down at 137, thence bent to form the fan housing 138. A fan 139 on shaft 140 drives a blast of air through the downwardly dropped carrier 84 and blows out the majority of the retained chaff. The straw and retained kernels are carried rearwardly and are subjected to an intermittent vibrating beating motion as the carrier 84 by reason of the rotation of the five sided roller 132 is caused to vibrate up and down upon the boards 141. The remaining kernels drop through the slats 123 upon the grain pan 144, the straw leaving the separator through the opening 142, being guided by the spring plates 143 attached to the side walls. The return of the slats 123 drags any kernels caught on the pan 144 towards the front end of the shoe chaffer 145. The fan 139 may be omitted and the plate 136 be of slats as at 135.

Figure 3:
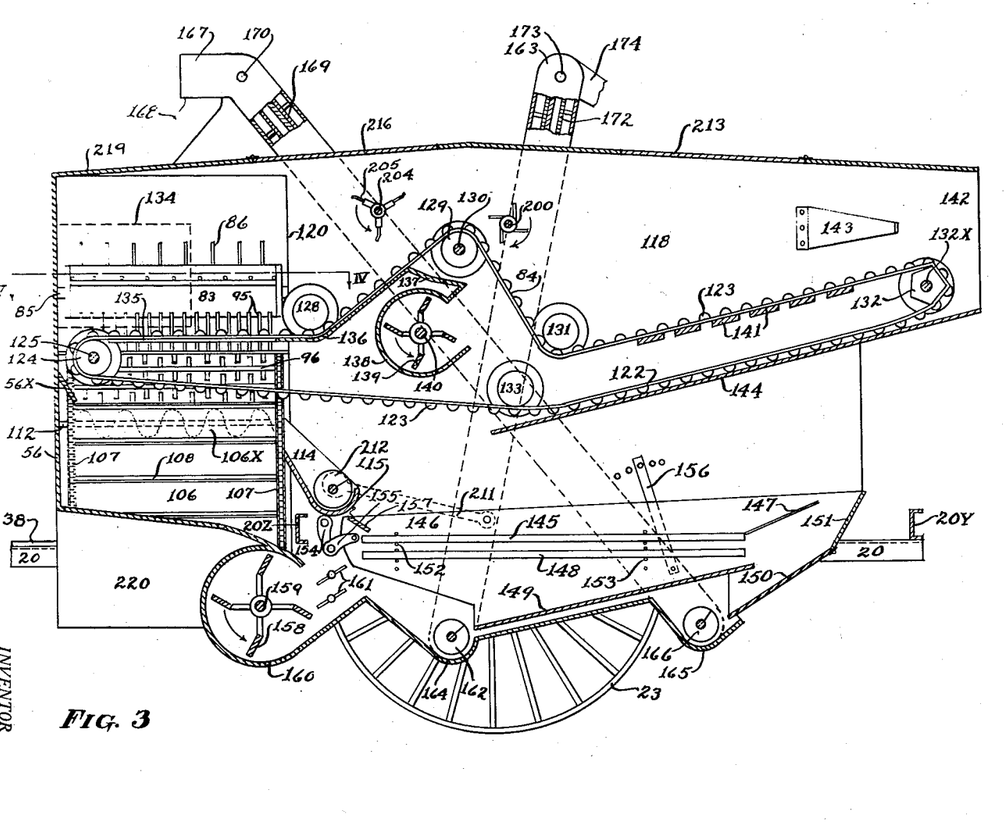
Fig. 3 is the right side elevation of the thrasher with the sides removed to disclose operative internal mechanisms.

The cleaning shoe 146 as seen in Fig. 3 is rearwardly arranged from the trough 115 and under the return pan 144. The shoe is fitted with the shoe chaffer 145 having a tail rake 147. At 148 is an adjustable screen. A sloping floor 149 is arranged below the screens while a sloping floor 150 and tailboard 151 are arranged at the rear of the shoe. The chaffer and the screen are adjustably supported as at 152 and 153. The shoe has an end shake motion being suspended at the front end by the crank elements 154 and 155 and at the rear by hangers 156. Beneath the trough 115 is a short pan 157 properly positioned on the shaking cleaning shoe 146 to deliver the kernels of grain distributed by the auger 116 and dropped from the edge 117 to the front end of the shoe chaffer 145. At 158 is seen the separator fan and fan shaft 159 rotating within the fan housing 160. At 161 are seen the wind boards for regulating the direction of the wind with respect to the screen and sieve. At 162 is the auger for the clean grain elevator 163 operating in its trough 164 which receives the cleaned grain from the floor 149 of the shoe. Similarly the tailings from the floor 150 are dropped into the tailings trough 165 and are delivered by the tailings auger 166 to the tailings elevator 167 and to the return spout 168 by means of the elevating mechanism 169, whose chain runs over sprockets on the shafts 166 and 170.

It will be noted that the superposed concave 64 over the front cylinder drops down to the line 171 so as to properly direct the straw stream to the gap spacing 63$^x$. It will be observed that this puts approximately one half of the cylinder surface 65 in action at all times. In Fig. 8 at the right of the edge 171 is a tailings concave element 64$^x$. The tailings from the spout 168 are dropped between the concave 64$^x$ and are acted upon by the upper bars 105 of cylinder 78 prior to reconduction into the gap spacing 63$^x$. This materially increases the working area of cylinder 78 over customary practice. From preference I have delivered the harvested straw to the overshot impeller 65 and thence to the undershot cylinder 78, since by so doing, the heavier grain tends to immediately separate through the concave elements 79 beneath the cylinder 78. It is obvious, however, that the cylinder shaft 69 may be rotated in the same direction as the shaft 77 of the impeller, or so as to permit of an overshot thrashing by the cylinder 78 and the superposed concave 64$^x$ of harvested elements received from the impeller 65 and thus eliminate the lower concave 73 or 96 from the combination.

The elevating mechanism 172 leads over sprockets on the shaft 173 and the auger shaft 162 and delivers the cleaned grain through spout 174 to the grain tank supported above the rear axle over the motor as indicated by the dotted circle 175 Fig. 1. This places the weight of the grain as a direct load on the heavier rear wheels and eliminates side draft. In case a tank 175 is not used, a wagon may be trailed behind the rear axle and grain lead from spout 174 direct to the wagon. This also eliminates side draft over the customary method of dragging a wagon at the side of the outer wheel such as 22. The line of draft is direct from the hitch 40. If desired the grain may be sacked upon the engine platform 39. Bringing the elevators 163 and 167 up behind the transverse passage at the side of the wall 118, assists in making the machine more compact and better balanced for draft.

Figure 11:
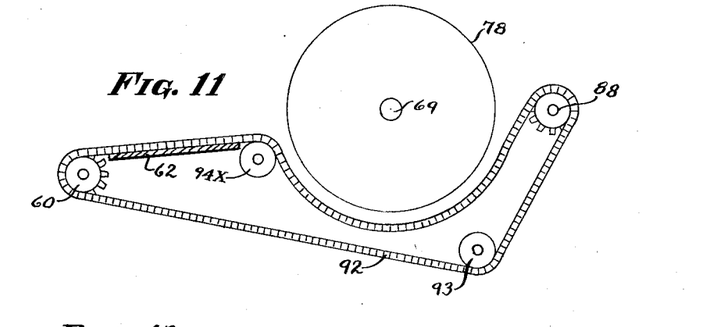
Fig. 11 represents a detail side view of an alternate arrangement of the cylinder and concave mechanisms.
Figure 12:
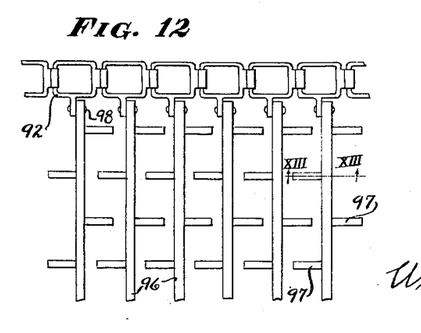
Fig. 12 is a fragmentary plan view of the combined traveling conveyor and concave mechanism as seen in Figs. 2 and 11.
Figure 13:
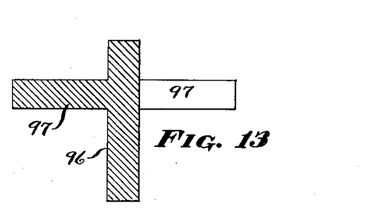
Fig. 13 is a sectional view taken through a concave bar along the line XIII—XIII, Fig. 12.

There is considerable similarity between the stationary concave Fig. 9 and the moving concave rake Fig. 12, the chains 92 corresponding to the side members 80, the bars 96 corresponding to the bars 79 and the ribs 97 corresponding to the rods 81. The bars 96 can be adjusted so the sag will be increased or decreased under the cylinder 78 by simply adding or removing links to the chain between the driven sprockets 88 and 89, since these sprockets are driven by another chain at the same speed. Fig. 11 shows a modification which eliminates the rake 57 and employs the traveling concave and rake mechanism Fig. 12 in lieu thereof.

The straw conveying means of the harvester advances the harvested elements directly against and across the periphery of the impeller 65. This impeller, located on the lower shaft 77, strips the harvested elements off the straw conveying means and elevates, drives and distributes said elements upon the periphery of the cylinder 78, located on the higher shaft 69.

The beater 83 may be omitted and the motor 35, the cylinder 78 and its concave 79 may be raised and moved closer to the wall 118, or so that the thrashed straw would be blown by the cylinder upon the straw racks, and the grain thrashed through the concave drained directly to a grain pan under the slatted floor 135, or straw walkers, for grain travel to the chaffer 145.

A sprocket rigid to the shaft 85 is driven by a chain from a sprocket on the cylinder shaft 69. A chain leading from a sprocket on the shaft 69 drives the beater shaft 67.

As seen in Fig. 1, a chain 178 driven by a sprocket on the shaft 77 drives the sprocket 179 rigid to the transverse shaft 180 rotatably mounted on the platform 26. The shaft 180 drives the pitman 180ˣ for actuating the sickle bar 48. The shaft 180 is also the main drive shaft for the header and elevator mechanism.

A chain leads from a sprocket on the shaft 77 around a sprocket on the shaft 91, a sprocket on the shaft 110 and a sprocket on the shaft 59 and then back to the sprocket on the shaft 77. This serves to drive the chain rake 57 and the traveling conveyor 107 and thus the auger shaft 112. A chain leads around equal sprockets on the shafts 91 and 90 whereby the traveling concave conveyor 92 is operated at a desired speed in its adjusted sagged concave position.

From a bevel gear and sprocket mechanism—not shown—driven off of the shaft 85 leads a chain to drive the fan shaft 140 and picker shaft 200. A chain driven from shaft 200 drives the shaft 170 to drive the chain 169. A chain driven from shaft 140 drives the picker shaft 204 and a chain from shaft 204 drives the shaft 173 to drive the chain 172. Thus the picker 205 serves to beat the straw downwardly upon the floor 136 and toss it rearwardly where it is picked upwardly by the picker 200 so that the straw is open to permit the blast from fan 139 to drive the chaff out through the opening 142. A chain driven from a sprocket on fan shaft 140 drives the separator fan shaft 159. A chain driven from a sprocket on the picker shaft 200 drives a sprocket rigid to the shaft 132ˣ. A chain driven from a sprocket on the auger shaft 162 drives the sprocket on the auger shaft 116.

Pitmen 211 drive from eccentrics 212 on the auger shaft 116 to shake the cleaning shoe 146, in an endwise manner. The roof 213 of the thrasher is given proper slope for drainage and fitted with hinged doors such as 216. Stoppages or repairs are readily made within the thrasher through such door openings as 214, 215, 216, 217, 218 and 219. Doors are suitably positioned wherever necessity demands, the arrangement of the walls 118, 119 at right angles to the walls 55 and 56 making it possible to get at working parts through door openings. This accessibility is very apparent and is one of the distinguishing advantages of my machine over separators arranged in the customary line. At 220 is shown the floor under the conveyor 107 and which bends upwardly at its left hand end, Fig. 2 as the floor element 220ˣ under the front part of the feed rake 57.

It will be understood that other well known elements may be employed at various places in my machine without departing from the intent of the invention; for instance, I may use a short rack under the beater 83 for delivering the thrashed straw from the cylinder 78 to the floor 135, and in lieu of the floor 106 and conveyor 107—108, I may employ the customary grain pan giving an endwise shake towards one end for grain travel. However, I prefer the use of a positive drag as given by the chain 107.

Such modifications may be employed as lie within the scope of the appended claims.

Having fully described my invention, what I now claim as new and desire to secure by Letters Patent is:

1. In a machine of the class described, a thrasher including a frame provided with wheel and allied elements as supports therefor; the body of said thrasher having an L-shaped passage comprising a first passage portion whose side walls are transversely positioned to the line of draft and a second passage portion whose side walls are parallel to the line of draft; and a cylinder rotatably arranged within the walls of the first passage, with its shaft parallel to said line of draft and concave means associated therewith.

2. In a machine of the class described, a thrasher including a frame element provided with wheel and allied elements as supports therefor; the body of said thrasher having an L-shaped passage comprising a first passage whose sidewalls are transversely positioned to the line of draft of the thrasher, and a second passage whose sidewalls are parallel to the line of draft, said passages connecting at a zone of intersection of the walls of said allied passages; a cylinder rotatably arranged within the walls of the forward passage with its shaft parallel to the line of draft of the machine and concave means associated therewith; conveying means for delivering harvested elements to the cylinder-concave passage and other means for receiving thrashed elements from the cylinder-concave passage and for transmitting the same to the second passage.

3. In a machine of the class described, a thrasher having wheel, axle and frame elements as supports therefor; said thrasher having an L-shaped body passage including a first passage, whose sidewalls are transversely positioned to the line of draft of the machine, and a second passage whose sidewalls are parallel to said line of draft; said first and second passages connecting at a zone of intersection of the walls of said allied passages; a concave and a cylinder in operative alliance forward of the said zone, with the shaft of the cylinder arranged parallel to said line of draft of the machine; straw carrying mechanism operable in the second passage and for receiving, on an actuating element in said zone, elements thrashed by the cylinder; a wall element of said second passage serving to retard flying grain and thrashed elements; and a curved vertical plate, above the actuating element and within the outer intersecting walls of the allied passages, as a deflector for turning the thrashed elements into the second passage for proper travel therein.

4. In a thrasher, a cylinder, a concave below the cylinder and associated therewith for thrashing the main body of the straw stream; and an auxiliary concave above and forward of the cylinder, a cleaner, means for admitting tailings from the cleaner for rethrashing by upper elements of the cylinder in conjunction with said auxiliary concave and for redelivery of said rethrashed elements again into the straw stream for a further rethrashing by the main concave and cylinder.

5. In a thrasher, a cylinder and a concave below the cylinder, the shaft of said cylinder being rotatably mounted in bearings provided in the framework of the thrasher and means for furnishing an undershot thrashing of the main straw stream through the passage intermediate the cylinder and concave; an auxiliary concave above and forward of said cylinder, a cleaner and means for admitting tailings from the cleaner for an overshot thrashing thereof by said auxiliary concave and the upper elements of the cylinder and for delivery of said rethrashed elements into the main straw stream for a further rethrashing by the cylinder and the main concave.

6. A machine as defined in claim 1, having a motor supported by frame elements in rear of the first passage portion, the shaft of said motor being axially aligned with and detachably connected with the shaft of said cylinder, whereby said cylinder when connected to the motor increases flywheel capacity.

7. In combination in a thrasher, a pair of cylinders rotatable in parallel relationship, a concave superposed above the first cylinder, an auxiliary concave contiguous said concave cooperating with the second cylinder, another concave beneath the second cylinder; means for occasioning rotation of said cylinders in opposite directions; and a gap spacing for straw passage over the first cylinder and under the second cylinder and a gap spacing between the second cylinder and the auxiliary concave opening into the first mentioned straw passage from above.

8. In a machine as described in claim 2, straw carrier and cleaning mechanisms in the second passage; a grain pan in the first passage, below the transmitting means for the thrashed elements, for receiving separated thrashed elements in the first passage and means for transmitting separated elements, caught by said pan, direct to the cleaning mechanisms.

9. In a machine as defined in claim 3, cleaning mechanisms arranged in the rearward passage below the straw carrier and for receiving droppings therefrom; a floor in the forward passage as a grain pan catching droppings from the thrashing elements and means for conveying said droppings from said grain pan to the cleaning mechanisms.

10. In a machine of the class described, a thrasher, wheel and allied supporting elements therefor; said thrasher having a first passage portion whose sidewalls are transversely positioned to the line of draft of the machine and a second passage portion whose sidewalls are parallel to said line of draft, said first and second passages connecting at a zone of intersection of the walls of said allied passages; a concave, a cylinder rotatably associated therewith forward of said zone and with the shaft of the cylinder also parallel to the line of draft of the machine; a straw carrier operable in the second passage and for receiving at said zone thrashed straw from the first passage; a wall element of said second passage serving to stop flying grain; and means for turning the straw, as received from the first passage, at said zone.

11. In a thrasher having an L-shaped body passage, cylinder and concave elements in one leg of the body and straw carrier means in the other leg of said body; a curved plate above said straw carrier and behind the cylinder within the zone of intersection of the legs of said L-shaped body passage; the opposite ends of said plate engaging, respectively, the outer side wall elements of both legs of the passage and forming a rounded corner as a straw turning element.

12. In a thrasher of the class described, wheels, axles and frame elements as supports therefor; a transverse body portion housing cylinder elements and a longitudinal body portion housing straw carrier and cleaning mechanisms; said composite body portions forming an L-shaped passage; and a motor carried at the rear of the transverse body portion and at the side of the longitudinal body portion, for driving the moving elements of the thrasher.

13. In a thrasher having an L-shaped body passage including a first passage transversely positioned to the line of draft of the machine and a second passage arranged in parallelism to said line of draft, said first and second passage elements connecting at a zone of intersection of the walls thereof; a floor in said zone and a straw carrier for the second passage arranged to travel upon said floor transversely to and at the rear of the transverse passage; a floor in the transverse passage extending under the first mentioned floor and conveying means associated therewith.

14. In combination in a thrasher, a pair of cylinder shafts rotatably mounted in bearings carried by side wall elements of the thrasher, said shafts being spaced apart a desired distance in parallelism; the first cylinder shaft having a cylindrical shaped periphery provided with rib elements running from one end to the other thereof and with cross rib elements connecting between the first mentioned rib elements and cup shaped recesses as pockets intermediate the ribs; the second cylinder shaft having drum ends associated therewith and rasp bars at spaced intervals connecting to said drums; a concave element superposed over the first cylinder; a concave element beneath the second cylinder and a straw passage leading over the first cylinder and under the second cylinder.

15. The method of thrashing headed grain straw by means of a combination harvester-thrasher which includes the conveyance of said straw in a stream transverse to the line of draft of the machine and during such conveyance, the passing of said straw intermediate a concave and a rotating cylinder; and then, the deflective turning and conveyance of the thrashed straw stream in parallelism to said line of draft and for ejection from the machine.

16. In a machine as defined in claim 3; a straw carrier in the second passage and cleaning mechanisms below the straw carrier and for receiving droppings therefrom; an auger, having its axis in parallelism with the axis of the cylinder, receiving thrashed droppings from the transverse passage; a distributing auger transversely positioned in the second passage above and delivering to the cleaning mechanisms and means intermediate said augers for transmitting thrashed elements from the first auger to the second auger.

17. In a machine of the class described; a thrasher having wheel, axle and frame elements and an L-shaped body element carried thereby; said body element including a forward passage transverse to the line of draft and a rearward passage parallel to the line of draft, connecting at a zone of intersection of the walls of the allied passages; a concave and a cylinder forward of said zone with the cylinder shaft parallel to the line of draft; straw carrier means operable in the rearward passage and for receiving straw from the transverse passage at said zone; cleaning mechanisms below the straw carrier means; an auger in parallelism with the cylinder for receiving thrashed elements from the transverse passage; a distributing auger above and for delivering to the cleaning mechanisms, said auger being arranged in the rearward passage and transverse to the first auger and means leading from the first auger and for delivering into the distributing auger.

18. In a machine of the class described, a thrasher having wheel and supporting elements and a body element carried thereby; said body element having a first passage portion transverse to the direction of travel of the machine and a second passage parallel to the direction of travel of the machine; said passages connecting at a zone of intersection of the walls of the allied passages; a cylinder and a concave forward of said zone with the shaft of the cylinder arranged from front to rear of the machine; conveying means for delivering harvested elements to the cylinder—concave passage and other means for receiving thrashed elements from the cylinder—concave passage and for transmitting the same to the second passage and for turning and distributing the thrashed elements and for conveying the same through the second passage; and a wall element of the second passage as a closure behind the cylinder to stop flying grain.

19. In a machine of the class described; sidewall elements of a thrasher body transversely positioned with respect to the direction of travel of the machine upon wheel supported frame means; a concave and a cylinder intermediate said wall elements, with the shaft of the cylinder pointing from front to rear of the machine; means forward of the cylinder for conveying head grain straw thereto in a travel transverse to the direction of travel of the machine and means for blowing thrashed straw away from the cylinder for a distance in a continuation of said prior travel; and sidewall elements of a second body portion, in parallelism to the cylinder shaft, connecting at a zone of intersection with the walls of the first body portion; a perforated element in said zone and straw conveying means in the second passage and means for turning the blown thrashed straw at said zone for rearward travel between the walls of the second body portion; the perforated element passing grain kernels to cleaning means operating in said second body portion.

20. A machine as defined in claim 2; and a straw conveying mechanism operable in the second passage and for receiving thereon the thrashed straw from the first passage and means for turning said straw at said zone of intersection.

21. In a machine as defined in claim 2; and other means for cleaning and delivering grains in the second passage.

22. In a machine of the class described, a thrasher having wheel and supporting elements carrying a body element composed of a first passage transverse to the direction of travel of the machine and a second passage at right angles to the first passage, said passages connecting at a zone of intersection of the walls of the allied passages; a cylinder and a concave forward of said zone with the shaft of the cylinder pointing from front to rear of the machine; means forward of the cylinder for conveying headed grain straw thereto for thrashing purposes; said straw travel and the subsequent thrashed straw travel being transverse to the direction of travel of the machine while in the first passage and to the zone of intersection and there to be subjected to a turning movement and a subsequent travel towards the rear of the machine and through the second passage for straw ejection from the machine.

23. A machine as described in claim 22; and means for promoting straw agitation and straw movements while in the second passage and other means promoting grain separation from said straw and for cleaning and collecting said grain.

24. A machine as defined in claim 22; and means including a perforated concave mechanism and straw conveying means for passing grain kernels for separation purposes in the first passage, and straw conveying means in the second passage, also passing grain kernels; and means in the first passage for collecting separated elements and means under the straw conveying means of the second passage and zone of intersection for also collecting separated elements and means for distributing all separated elements as collected in both passages upon cleaning elements arranged in the second passage and operable therein.

25. In a machine as defined in claim 18; and means in the first passage, in said zone and in the second passage for permitting and causing separation of grains from straw and while continuing the travel of straw for rearward ejectment from the machine to effect a collection of said separated elements upon cleaning means operable and arranged under the second passage.

26. In a machine as defined in claim 22; and means for occasioning separation of grain from straw at the cylinder, during thrashed straw travel in the first passage, the zone of intersection and in the rearward travel of the said straw upon the final straw conveying means; and means for collecting said separated grain elements in the first passage and for turning said separated elements at said zone of intersection, with the added separated elements there received, and for properly distributing said separated elements upon a sieve of a cleaning mechanism of said thrasher, which sieve also is receiving separated elements passed from the straw conveying means of the second passage.

27. In a thrasher as defined in claim 4; and an over shot cylinder and a superposed concave forward of said auxiliary concave and for thrashing and delivering the main body of the straw stream prior to its thrashing by the first mentioned cylinder and concave.

28. A machine as defined in claim 1; and a grain pan therefor; and straw conveying means and cleaning mechanisms in the second passage for receiving thrashed straw and separated grains from the first passage.

29. A machine as defined in claim 1; having a motor supported by frame elements in rear of the first passage and at the side of the second passage; the shaft of said motor being axially aligned with and detachably connected with the shaft of said cylinder.

30. In a machine of the class described, a pair of shafts rotatably mounted in bearings on the thrasher frame, said shafts being spaced apart a desired distance in parallelism with the first shaft below the second shaft; an overshot rotary impeller carried by the first shaft and a rotary thrashing cylinder carried by the second shaft and a concave associated therewith; a feed house housing said impeller and a passage therein and over the impeller and leading to the cylinder; conveying means for delivering harvested elements to said passage for an overshot transmittal thereof by said impeller to said cylinder and concave assembly for thrashing purposes.

31. In a machine as described in claim 30; and a separator beyond the cylinder for receiving thrashing elements from said cylinder.

32. In a machine of the class described; a rotary impeller, a rotary cylinder and a concave associated therewith; the shaft of the impeller being parallel to but arranged to rotate below the rotatable shaft of the cylinder and bearings supporting said rotatable elements; an enclosure for the impeller, a straw passage leading therefrom to the cylinder and means for conveying harvested elements to said enclosure and to the rotary impeller; rotation of said impeller operating to receive said harvested elements and to drive the same through the passage at a highly impelled speed to said cylinder and concave for thrashing purposes.

33. In a machine as described in claim 32; and a separator beyond the cylinder for receiving thrashed elements from said cylinder.

34. In a machine of the class described; a rotary impeller, a rotary cylinder and a concave associated with the cylinder; the shaft of the impeller being parallel to but at a lower position than the shaft of the cylinder and bearings supporting the rotatable elements; an enclosure for the impeller, a straw passage leading therefrom to the cylinder and means for conveying harvested elements to said enclosure and directly to the periphery of the rotary impeller; rotation of said impeller operating to grasp said harvested elements from the conveying means and to drive and distribute the same at a highly impelled speed against the cylinder for thrashing purposes.

35. In a machine as described in claim 34; and a separator beyond the cylinder for receiving thrashed elements from said cylinder.

36. In a machine of the class described; an enclosure and a rotary impeller mounted therein, a thrashing chamber and a rotary cylinder and a concave arranged therein; the shaft of the impeller being parallel to but below the shaft of the cylinder; a straw passage communicating between the enclosure and the chamber; means for conveying harvested elements to the enclosure and directly to and across the periphery of the rotating impeller; rotation of said impeller operating to seize advancing harvested elements from the conveying mechanism and to elevate said elements through the straw passage and to distribute the same upon the cylinder for thrashing purposes.

37. In a machine as described in claim 36; and a separator beyond the cylinder for receiving thrashed elements from said cylinder.

WILLIAM C. EDWARDS, Jr.